US007382769B1

(12) United States Patent
Rijsman

(10) Patent No.: US 7,382,769 B1
(45) Date of Patent: Jun. 3, 2008

(54) AUTOMATIC FILTERING TO PREVENT NETWORK ATTACKS

(75) Inventor: Bruno Rijsman, Cambridge, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1097 days.

(21) Appl. No.: 10/361,715

(22) Filed: Feb. 7, 2003

(51) Int. Cl.
*H04L 12/66* (2006.01)

(52) U.S. Cl. ...................... 370/352; 370/401
(58) Field of Classification Search ............ None
See application file for complete search history.

(56) References Cited

U.S. PATENT DOCUMENTS

| | | | |
|---|---|---|---|
| 6,859,455 B1 * | 2/2005 | Yazdani et al. ............ 370/392 |
| 7,185,103 B1 * | 2/2007 | Jain ........................... 709/234 |
| 2002/0032793 A1 * | 3/2002 | Malan et al. ............... 709/232 |
| 2003/0014665 A1 * | 1/2003 | Anderson et al. .......... 713/201 |
| 2003/0115480 A1 * | 6/2003 | McDysan .................... 713/201 |
| 2003/0189932 A1 * | 10/2003 | Ishikawa et al. ........... 370/392 |

* cited by examiner

*Primary Examiner*—Huy D. Vu
*Assistant Examiner*—Phuongchau B Nguyen
(74) *Attorney, Agent, or Firm*—Shumaker & Sieffert, P.A.

(57) ABSTRACT

Techniques are described for preventing network attacks. More specifically, the techniques involve classification of routes based on the network protocol from which the routes were learned, and filtering of packets based on the classification. A network device, for example, is described that includes interface cards to receive routing information via one or more routing protocols, wherein the routing information defines network routes. The network device further includes a control unit to classify the routes based the routing protocol by which the routes were received, and selectively forward packets associated with the routes based on the classification of the routes. Edge routers within a server provider network, for example, may classify routes as either "internal" or "external" based on the protocols from which the routes were learned, and automatically filter packets to prevent network attacks using the techniques.

20 Claims, 6 Drawing Sheets

ROUTING DATA

| ROUTE | PROTOCOL | ROUTE CLASS |
|---|---|---|
| {8A,6A} | BGP | E |
| {8A,6A,4A} | BGP | E |
| {8A,10B,8B} | RIP | I |
| {8A,10B,8B,6B} | BGP | E |
| {8A,10A,8C,14} | BGP | E |
| {8A, 10A, 8C} | OSPF | I |

FIG. 5

FORWARDING DATA

| DESTINATION | NEXT HOP | DESTINATION CLASS |
|---|---|---|
| 6A | NH1 | E |
| 4A | NH2 | E |
| 8B | NH3 | I |
| 6B | NH4 | E |
| 14 | NH5 | E |
| 8C | NH6 | I |

FIG. 6

AUTOMATIC FILTERING TO PREVENT NETWORK ATTACKS

TECHNICAL FIELD

The invention relates to computer networks and, more particularly, to improving resistance to network attacks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet and forwards the packet in accordance with the routing information.

Large computer networks, such as the Internet, often include many routes grouped into administrative domains called "autonomous systems." In order to maintain an accurate representation of the network, routers periodically exchange routing information in accordance with defined protocols. These routing protocols generally fall into two categories. Routers located at the edges of different autonomous systems generally use exterior routing protocols to exchange information. One example of an exterior routing protocol is the Border Gateway Protocol (BGP). Routers within an autonomous system generally utilize interior routing protocols for exchanging routing information. One example of an interior routing protocol is the Intermediate System to Intermediate System (ISIS) protocol, which is an interior gateway routing protocol for IP networks for communicating link-state information within an autonomous system. Other examples of interior routing protocols include the Open Shortest Path First (OSPF), and the Routing Information Protocol (RIP).

When two routers initially connect, they typically exchange all of their routing information. The routers send control messages to incrementally update the routing information when the network topology changes. For example, the routers may send update messages to advertise newly available routes, and to withdraw routes that are no longer available.

Conventional routers often maintain the routing information in the form of one or more routing tables or other data structures. The form and contents of the routing tables often depends on the routing algorithm implemented by the router. Furthermore, some conventional routers generate and maintain forwarding information in accordance with the routing information. The forwarding information associates network routes with specific forwarding next hops and corresponding interface ports of the router. The forwarding information may, therefore, be thought of as a subset of the routing information. The process of generating the forwarding information is generally referred to as route resolution.

A conventional router may be susceptible to a network attack, such as a denial of service (DOS) attack, which occurs when a malicious party directs a high volume of packets to the routing device in an attempt to sabotage network operation. The high traffic volume can overwhelm the routing device, leaving it unable to process the inbound packets. For example, in one type of DOS attack, a perpetrator sends a large number of "ping" requests to network broadcast addresses, which are special addresses used to broadcast messages to other devices on the network. When sending the requests, the perpetrator spoofs the source address of a routing device targeted by the attack. In response to the requests, the other network devices reply to the targeted routing device, thereby inundating the targeted routing device with packets.

Conventional approaches for prevention of network attacks typically rely on application of packet filters. A service provider network, for example, may attempt to reduce the potential for an attack on devices within the network by filtering inbound packets at the edge of the network. More specifically, the service provider may configure filters within routers along the edge of the network to selectively filter packets entering the network based on the specified destinations. The service provider may, for example, configure the filters of the edge routers to compare the destinations specified by the inbound packets with a list of internal network destinations. When matches are detected, the edge routers may drop the matching packets unless an exception or other configured policy specifies otherwise. In this manner, the filters may effectively drop malicious traffic destined for internal devices. Network traffic flowing through the service provider network, i.e., traffic that specifies a network destination external to the service provide network, is unaffected.

This technique, however, can be very tedious to implement and maintain, and may consume considerable computing and administrative resources. To be effective, these filters require an exhaustive list of destinations within the service provider network for which inbound traffic should be filtered. Moreover, each of these edge devices is typically manually configured, and must be updated whenever the internal network destinations of the service provider change. As a result, this technique can be labor intensive and prone to error, which may expose the service provider to risk of a network attack.

SUMMARY

In general, the invention is directed to automated techniques for preventing network attacks. More specifically, the techniques involve the classification of routes based on the network protocol by which a routing device learns of the routes, and the automatic filtering of packets based on the classification. Edge routers within a local network, for example, may maintain classification data that classify routes as either "internal" or "external" based on the protocols from which the routes were learned. By utilizing this classification data, along with monitoring the interfaces from which packets are received, the edge routers can automatically filter potentially malicious packet flows without requiring application of complex, destination-specific filters.

In one embodiment, a network device comprises interface cards to receive routing information via one or more routing protocols and that defines network routes. The network device further includes a control unit to classify the routes based the routing protocol by which the routes were received, and to selectively forward packets associated with the routes based on the classification of the routes In another embodiment, a method comprises receiving routing information via one or more routing protocols, wherein the routing information defines network routes, and classifying the routes based the routing protocol by which the routes were received. The method further comprises selectively forwarding packets associated with the routes based on the classification of the routes.

In another embodiment, a method comprises receiving a packet with a network interface having one of a plurality of interface designations, and associating the packet with a route learned by a routing protocol. The method further comprises detecting a network attack based on the routing protocol and the interface designation of the network interface.

In another embodiment, a method comprises receiving a packet with an interface designated as either an internal interface connected to device within a local network or an external interface connected to device not within the local network, and automatically filtering the packet based on the designation of the interface and a type of routing protocol by which a route associated with the packet was learned from a routing device.

In another embodiment, a method comprises receiving routing information via one or more routing protocols, wherein the routing information defines routes to network destinations, generating forwarding information in accordance with the routing information, wherein the forwarding information defines classification data for the network destinations based on the routing protocol by which the routes to the network destinations were received, and receiving packets by a set of interfaces, wherein a first subset of the interfaces are designates as internal interfaces connected to devices within the local network, and a second set of the interfaces are designates as external interfaces connected to devices are not within the local network. The method further comprises associating the packets with the network destinations in accordance with the forwarding information, and selectively forwarding the packets to the network destinations based on the designation of the respective interfaces from which the packets were received and the classification data for the network destinations associated with the packets.

In another embodiment, a computer-readable medium comprises instructions to cause a programmable processor to receive a packet with a network interface having one of a plurality of interface designations, associate the packet with route classification data, wherein the route classification data classifies a route based on a routing protocol by which the route was learned from a routing device, and detect a network attack based on the route classification data and the interface designation of the network interface.

In another embodiment, a computer-readable medium comprises forwarding data for causing a control unit of a network device to forward packets to next hops along network routes, and route classification data for causing the control unit to selectively drop packets based on types of routing protocols by which the routes were learned from routing devices and types of interfaces by which the packets were received.

The techniques may provide one or more advantages. By utilizing route classification data, edge routers for a network, e.g., a service provider network, need not be rely on application of numerous destination-specific packet filters to prevent network attacks. As a result, the techniques described herein may achieve reduced computing resources in comparison with conventional techniques for preventing network attacks.

Moreover, administrators need not manually configure filters within the edge routers to selectively filter packets entering the local network. In particular, the routers adaptively maintain route classification data as new routes are learned from peer routers within the network environment. As a result, the techniques may avoid significant administrative resources that otherwise would be necessary to manually maintain destination-specific filters within the routers. Moreover, the techniques may be less prone to error, thereby reducing or eliminating any exposure to a network attack that may occur as a result of human error.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 illustrates an example embodiment of a portion of routing information arranged consistent with the principles of the invention.

FIG. 6 illustrates an example embodiment of a portion of forwarding information arranged consistent with the principles of the invention.

DETAILED DESCRIPTION

Figure 1:
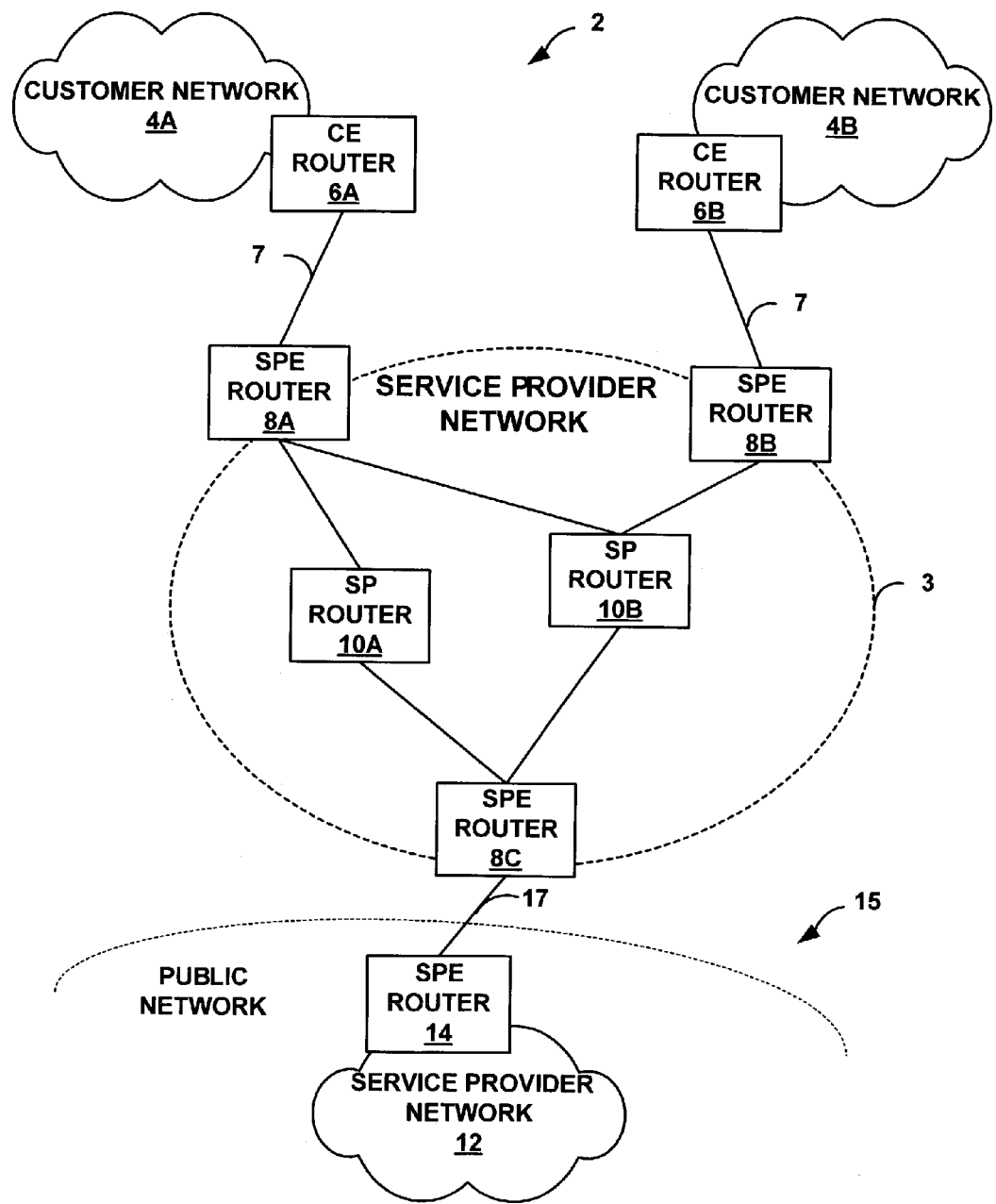
FIG. 1 is a block diagram illustrating an example network environment in which edge routers within a local network, e.g., a service provider (SP) network, automatically filter network traffic consistent with the principles of the invention.

FIG. 1 is a block diagram illustrating an example network environment 2 in which a service provider (SP) network 3 automatically filters network traffic in accordance with the principles of the invention. As illustrated, SP network 3 is coupled to a plurality of "external" networks. For example, SP network 3 provides network connectivity to a plurality of customer networks 4A, 4B ("customer networks 4"). In particular, SPE routers 8A, 8B are coupled to customer edge (CE) routers 6A, 6B ("CE routers 6") via access links 7. Although an actual service provider may provide services to a large number of dispersed customer networks 4, for simplicity, FIG. 1 shows only two customer networks 4 served by the service provider edge (SPE) routers 8A, 8B.

In addition, SP network 3 may be coupled to one or more external service provider networks, which may form part of a large-scale public network 15, e.g., the Internet. For example, SPE router 8C is coupled to SPE router 14 of SP network 12 via access links 17. Consequently, customer networks 4 can be viewed as edge networks for which SP network 3 provides connectivity to public network 15, as well as a variety of other network services.

SP network 3 may include a number of internal SP routers 10A, 10B ("SP routers 10") for carrying network traffic between customer networks 4 and public network 15.

Although not illustrated, SP network 3 may further include a variety of network devices, including other internal routers, web servers, database servers, switches, and the like. In accordance with the principles of the invention, SP network 3 employs automated techniques for preventing attacks on devices located within the network. As described herein, the techniques provide for the automated filtering of packets at the edges of SP network 3, i.e., points within the network topology at which network traffic flows into and out of the network.

More specifically, SPE routers 8 located at the edge of SP network 3 employ techniques for classification of routes based on the network protocol from which the routes were learned, and the filtering of packets based on the classification. In order to maintain an accurate network topology, SPE routers 8 periodically exchange routing information with other routing devices, e.g., CE routers 6, SP routers 10, and SPE router 14, in accordance with defined protocols. SPE routers 8 typically utilize one or more exterior routing protocol to exchange routing information with routers of other domains or autonomous systems, e.g., CE routers 6 and SPE routers 14. For example, SPE router 8C may utilize the Border Gateway Protocol (BGP) to share routing information with SPE router 14. In this manner, SPE routers 8 learn of "external" routes to devices external to SP network 3. Similarly, SPE routers 8 exchange routing information with SP routers 10 using one or more interior routing protocols, e.g., IBGP, IS-IS, OSPF, RIP, and the like, to learn of "internal" routes to devices within SP network 3.

In accordance with the principles of the invention, SPE routers 8 maintain data to identify routes as either "internal" or "external" based on the protocols from which the routes were learned. For example, SPE router 8A may maintain route classification data to identify routes learned from CE router 6A via an exterior routing protocol as "external," and routes learned from SP router 10A via an interior routing protocol as "internal routes." Based the route classification data, SPE routers 8 automatically filter inbound network traffic received from external networks, e.g., customer networks 4 and SP network 12, to prevent network attacks on devices within SP network 3, e.g., internal routers, web servers, database servers, switches, and the like.

As described in further detail below, SPE routers 8 may be automatically configured to filter network packets received from external networks to be forwarded via internal routes, as designated by the route classification data. In this situation, the inbound packets are likely destined for a device within SP network 3 and, unless previously overridden by policy, are automatically dropped. In this manner, SPE routers 8 may be configured to automatically drop packets originating from a source external to SP network 3 and destined for a device within the network, which is typical for malicious packet flows associated with network attacks.

SPE routers 8 do not filter packets to be forwarded via routes identified as external, i.e., routes learned via external routing protocols, and forward the packets through SP network 3 in normal course. In this manner, traffic originating from an external network and destined for external devices continues to flow through SP network 3.

By utilizing route classification data, SPE routers 8 need not rely on application of destination-specific packet filters to prevent network attacks. Consequently, to determine whether to drop received packets, SPE routers 8 need not perform substantial additional processing. As a result, the techniques described herein may achieve reduced computing resources in comparison with conventional techniques for preventing network attacks.

Moreover, the service provider need not manually configure filters within SPE routers 8 along the edge of SP network 3 to selectively filter packets entering the network based on the specified destinations. In particular, SPE routers 8 adaptively update the route classification data as new routes are learned from peer routers within network environment 2. As a result, the techniques may allow the service provider to avoid expending significant administrative resources that otherwise would be necessary to manually maintain specific filters within SPE routers 8. Moreover, the techniques may be less prone to error, thereby reducing or eliminating any exposure to a network attack that may occur as a result of human error.

Figure 2:
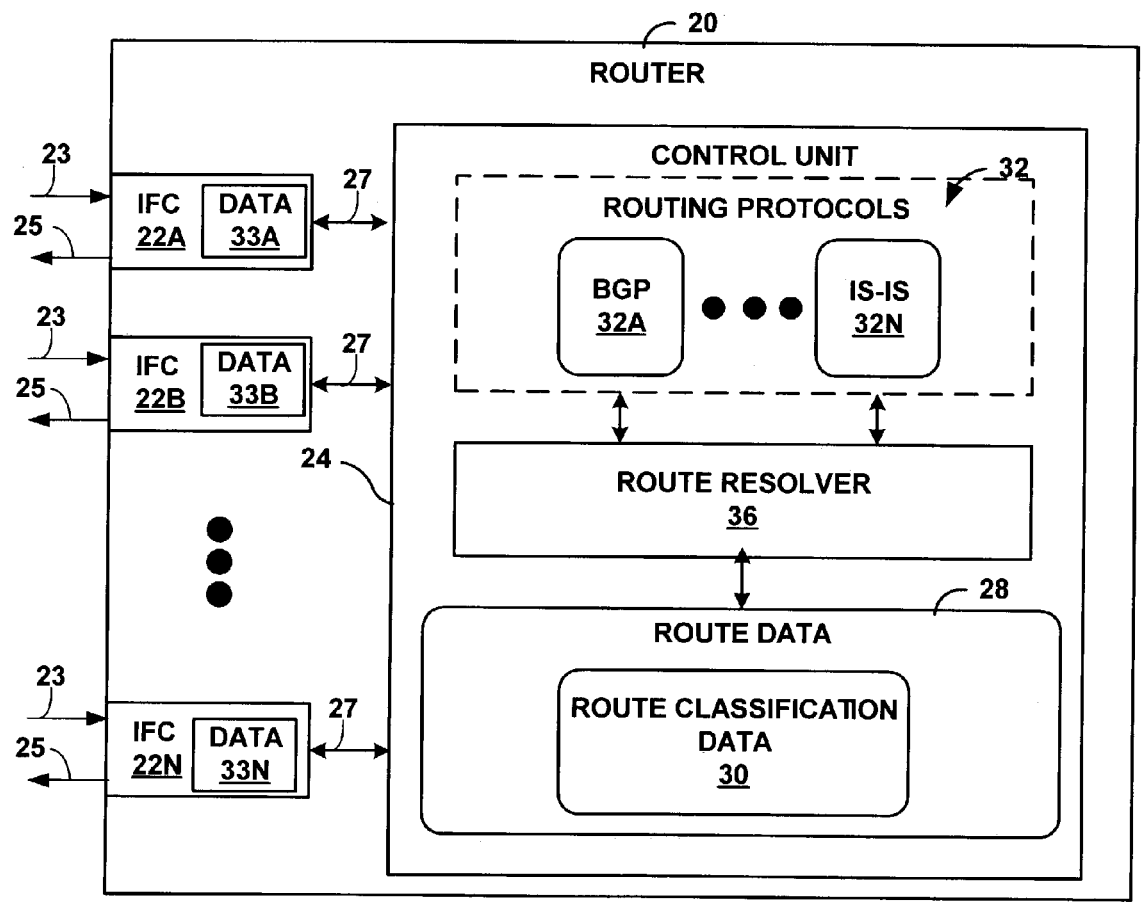
FIG. 2 is a block diagram illustrating an exemplary embodiment of a router that automatically filters packets consistent with the principles of the invention.

FIG. 2 is a block diagram illustrating an exemplary embodiment of router 20 that filters packets in accordance with the principles of the invention. Router 20 selectively filters packet flows based on classifications for routes associated with the packet flows and, more particularly, based on classifications for routing protocols from which the routes were learned.

Router 20 includes interface cards 22A-22N ("IFCs 22") that receive and send packet flows via network links 23 and 25, respectively. IFCs 22 are typically coupled to network links 23, 25 via a number of interface ports (not shown), and forward and receive packets and control information from control unit 24 via a respective interface 27. Router 20 may include a chassis (not shown) having a number of slots for receiving a set of cards, including IFCs 22. Each card may be inserted into a corresponding slot of a chassis for electrically coupling the card to a control unit 24 via a bus, backplane, or other electrical communication mechanism.

In general, router 20 receives inbound packets from network links 23, determines destinations for the received packets, and outputs the packets on network links 25 based on the destinations. More specifically, control unit 24 receives routing information from other routing devices that describes a topology of a network environment and, in particular, routes through one or more networks within the environment. Based on the routing information, router 20 generates route data 28 that describes the routes, and corresponding route classification data 30 that indicates a classification for each of the routes. For example, route classification data 30 may classify each route as "external" or "internal" based upon the routing protocol 32 from which each of the routes was learned. Control unit 24 may maintain route data 28 in the form of one or more tables, databases, link lists, radix trees, databases, flat files, or any other data structures.

Routing protocols 32 represent various protocols by which router 20 exchanges routing information with other routing devices, thereby learning the topology of the network, i.e., the routes through the network. Routing protocols may include exterior routing protocols to exchange routing information with routers of other domains or autonomous systems, e.g. BGP routing protocol 32A. In addition, router 20 may include interior routing protocols, e.g., IS-IS routing protocol 32N to learn of "internal" routes.

Upon receiving routing information from another router, route resolver 36 processes the information to generate route data 28. In accordance with the principles of the invention, route resolver 36 maintains route classification data 30 to identify routes as either "internal" or "external" based on the protocols 32 from which the routes were learned. For example, route resolver 36 may maintain route classification data 30 to identify routes learned via an exterior routing protocol as "external," and routes learned via an interior routing protocol as "internal."

IFCs 22 may receive the packet from one of customer networks 4 or from public network 15. Upon receiving an inbound packet via one of inbound links 23, a respective one of IFCs 22 relays the packet to control unit 24. In response, control unit 24 reads a block of data from the packet, referred to as the "key," that includes a network destination for the packet. The key may, for example, contain a routing prefix for another router within the network. Based on the destination, control unit 24 analyzes route data 28 to select a route for the packet, and examines route classification data 30 to determine whether the selected route is classified as external or internal. Based on the classification, control unit 24 performs an automated filtering operation, and selectively drops or forwards the packet in accordance with the principles of the invention.

Control unit 24 may determine whether to automatically drop or forward the packet based on the classification of the route, and the particular one of IFCs 22 from which the packet was received. Each of IFCs 22 may include data 33 that designates the respective interfaces as external or internal based on links 23, 25 and, in particular, whether the links physically couple router 20 to devices within external or internal networks. Control unit 24 may be automatically configured to filter network packets that are received from IFCs 22 designated by data 33 as coupled to external networks, and that are to be forwarded via internal routes, as designated by route classification data 30. In this situation, the inbound packets are likely part of a malicious packet flow and, unless overridden by policy, are automatically dropped by control unit 24. Although illustrated for exemplary purposes as distributed within IFCs 22, control unit 24 may centrally maintain data 33. If a packet is not automatically dropped or otherwise filtered, control unit 24 determines an interface port associated with the selected route, and forwards the inbound packet to the appropriate IFC 22 for transmission.

The architecture of router 20 illustrated in FIG. 2 is for exemplary purposes only, and the principles of the invention are not limited to this architecture. Router 20 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of router 20 may be implemented by executing the instructions of the computer-readable medium with one or more processors, discrete hardware circuitry, firmware, software executing on a programmable processor, or a combination of any of the above.

Figure 3:
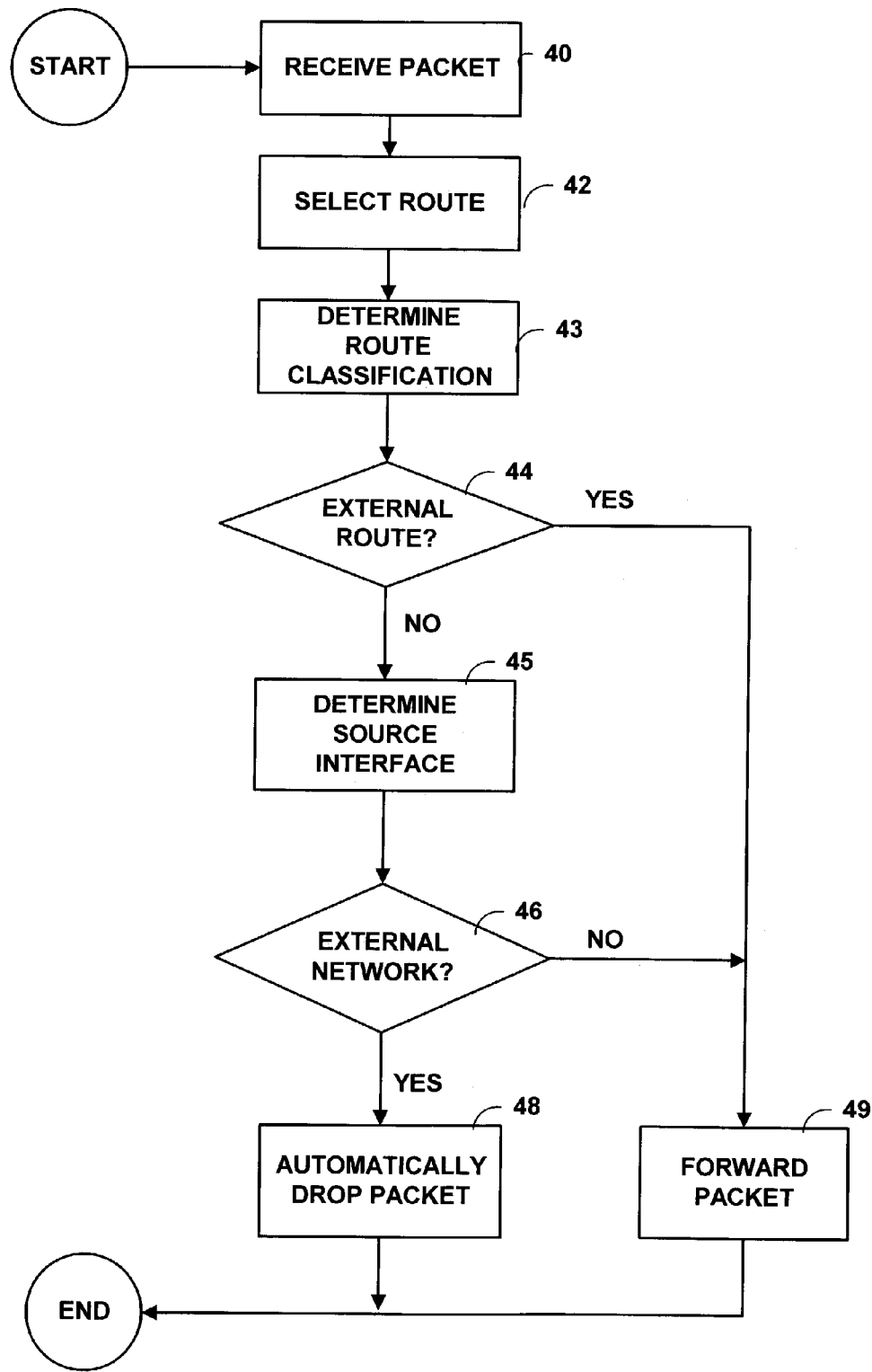
FIG. 3 is a flow chart illustrating example operation of a router consistent with the principles of the invention.

FIG. 3 is a flow chart illustrating example operation of router 20 in accordance with the principles of the invention. Upon receiving an inbound packet (40), control unit 24 accesses route data 28 to select a route (42). In addition, control unit 24 accesses route classification data 28 to determine a classification for the selected route, e.g., internal or external, based on the routing protocol 32 by which the route was learned (53).

If the selected route is classified as external (44), i.e., learned via an exterior routing protocol, control unit 24 continues the forwarding process without automatically dropping the packet (49). In other words, because the selected route has been learned by an exterior routing protocol, the destination of a packet is likely external to the network or domain of router 20. As a result, the packet is not likely part of a malicious packet flow that forms the basis of an attack on a server or other computing device within the domain. The packet, therefore, can be forwarded to the next hop en route to the destination.

However, if the selected route is classified as internal, i.e., learned via an interior routing protocol, the packet is determined to be potentially dangerous to the local network unless overridden by internal policy. Policy may be used, for example, to automatically classify certain routes learned by an interior routing protocol as "external" if internal devices associated with the routes are accessible outside of the protected network. In this case, control unit 24 determines the designation of the source interface from which the packet was received (45). In particular, control unit 24 determines whether the source interface is designated as coupled to an inbound link 23 coupled to an external network, as indicated via data 33 for the receiving interface.

If the packet was received from an external network (46), i.e., via an interface designated as external by respective data 33, control unit 24 detects a network attack and automatically drops the packet (48). Because control unit 24 has determined that the forwarding route was learned via an interior routing protocol, the actual destination is likely an internal device with the local network or domain of router 20. However, because the source interface of the packet is designated as external, the packet likely originated from a source external to the local network. As a result, control unit 24 determines that there is a high likelihood that the packet is part of a malicious network attack and automatically drops the packet. Although illustrated for exemplary purposes as dropping the packet, control unit 24 may invoke a variety of operations when detecting the presence of a possible network attack. For example, control unit 24 may issue notification messages to other routers within the local network that an attack may be present, divert the suspicious packet flows to other devices for more detailed packet analysis, automatically monitor bandwidth consumption and other details of the packet flows, and the like.

If the source interface for the packet is designated as an internal interface, i.e., an interface coupled to a device with the local network, control unit 24 forwards the packet to the next hop en route to its final destination (49). In this situation, the packet has already passed the border or edge of the local network and, if part of a network attack, would have been filtered by another edge router of the local network that originally received the packet from an external source.

Figure 4:
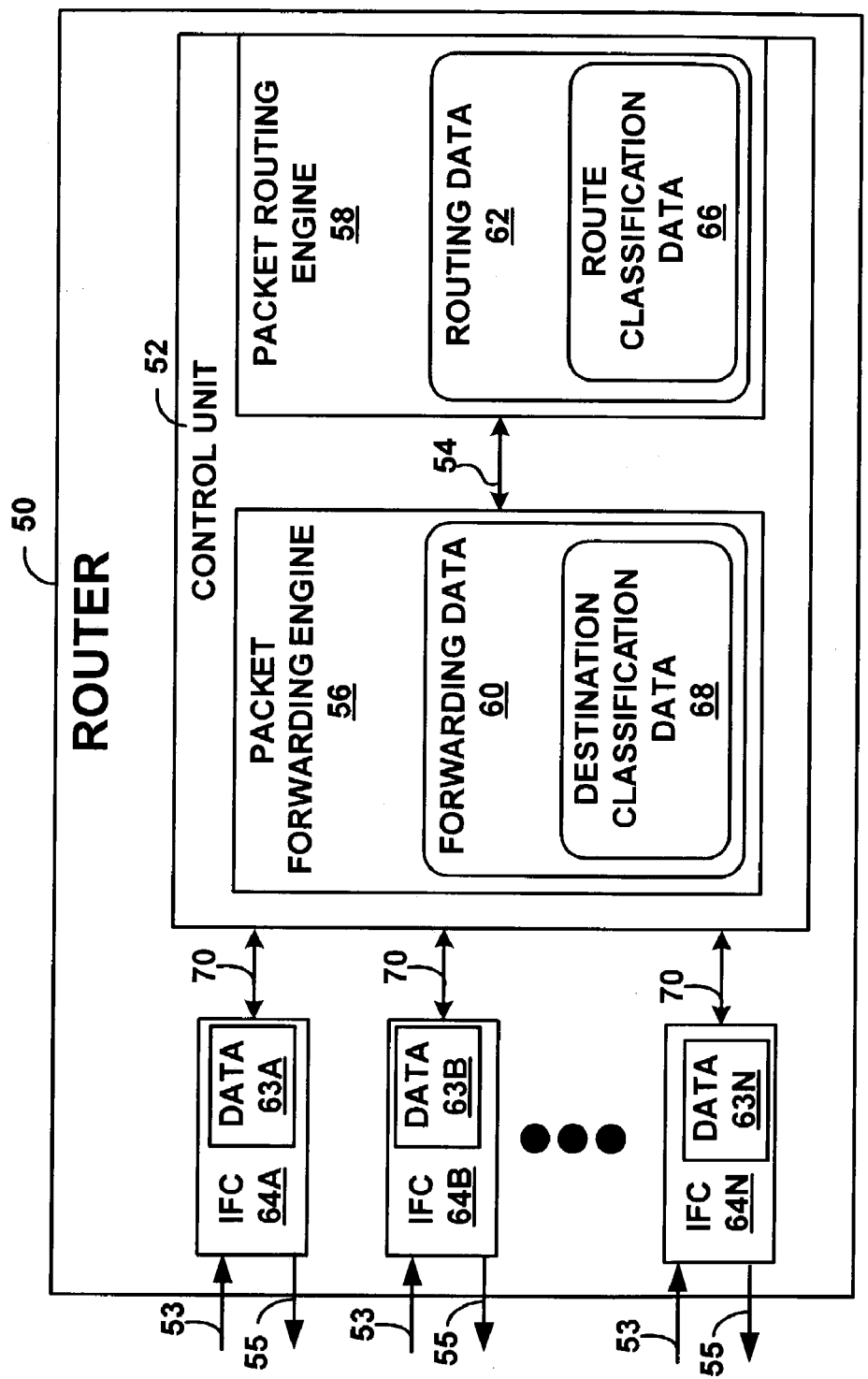
FIG. 4 is a block diagram illustrating another example embodiment of a router that utilizes automated filtering techniques to prevent network attacks consistent with the principles of the invention.

FIG. 4 is a block diagram illustrating another example embodiment of router 50 consistent with the principles of the invention. In the illustrated embodiment, router 50 includes a control unit 52 that directs inbound packets received from inbound link 53 to the appropriate outbound link 55. In particular, the functionality of control unit 22 can be divided between a routing engine 58 and a packet-forwarding engine 58.

Routing engine 58 is primarily responsible for maintaining routing data 62 to reflect the current network topology based on routes learned from other routers, and generates forwarding data 60 in accordance with routing data 62 to associate destination information, such as IP address prefixes, with specific forwarding next hops (FNHs) and corresponding interface ports of interface cards (IFCs) 64. Forwarding data 60 may, therefore, be thought of as based on the information contained within routing data 62. In response to topology changes, routing engine 24 analyzes routing data 62, and regenerates forwarding data 60 based on the affected routes. Routing engine 58 communicates forwarding data 60 to forwarding engine 56 for use in forwarding network packets. Routing engine 58 and packet forwarding engine 56 may maintain routing data 62 and forwarding data 60 in the form of one or more tables, databases, link lists, radix trees, databases, flat files, or any other data structures.

Upon receiving an inbound packet, packet-forwarding engine 56 directs the inbound packet to an appropriate one or more of IFCs 64 for transmission based on forwarding data 60. In one embodiment, each of packet-forwarding engine 56 and routing engine 58 may comprise one or more dedicated processors, hardware, and the like, and may be communicatively coupled by data communication channel 54. Data communication channel 54 may be a high-speed network connection, bus, shared-memory or other data communication mechanism.

As illustrated, routing engine 58 maintains routing data 62 to include route classification data 66 to indicate a respective classification for each route. As described above, route classification data 66 may classify each route as "external" or "internal" based upon the routing protocol from which each of the routes was learned. In addition, routing engine 58 generates forwarding data 60 to include destination classification data 68, which classifies each network destination, such as IP address prefixes, as either "external" or "internal." In particular, routing engine 58 processes routing data 62 to resolve routes to network destinations associated with forwarding next hops, and generates destination classification data 68 to classify each network destination based on the corresponding route. Routing engine 58 classifies a destination associated with a route learned via an exterior routing protocol, for example, as external. Similarly, routing engine 58 classifies a destination associated with a route learned via an interior routing protocol as internal. In this manner, forwarding data 60 can be viewed as a subset of routing data 62, and destination classification data 68 can be viewed as a subset of route classification data 66.

When one of IFCs 64 receives a packet of a packet flow via a respective inbound network link 23, it relays the packet to forwarding engine 56 via interface 70. In response, forwarding engine 58 reads a key from the packet that describes a network destination for the packet, and applies automated packet filtering to prevent attacks on devices within a local network. More specifically, forwarding engine 58 selects a destination and a FNH for the packet from forwarding data 60, and selectively drops or forwards the packet in accordance with the principles of the invention. As described, forwarding engine 58 selectively drops or forwards the packets based on the classification of the destination, and whether the source IFC 64 from which the packet was received is coupled to an internal or external device, as designated by data 63. The architecture of router 50 illustrated in FIG. 4 is for exemplary purposes only.

FIG. 5 illustrates an example embodiment of a portion of routing data 62 of FIG. 4. In particular, routing data 62 is illustrated for an example router 8A of FIG. 1. In the illustrated embodiment, routing data 62 describes a number of routes 82 through a networking environment, protocols 84 associated with routes 82, and a route classification (class) 86 for the routes based on the protocol via which the route was learned.

Each of routes 82 includes an ordered listed of nodes within networking environment 2, listed from a source node to a destination node. In practice, each node may be identified by a unique network address or destination, such as an IP address prefixes. For simplicity, FIG. 5 illustrates each route as a list of reference numerals of devices depicted within FIG. 1.

Protocols 84 can be any of a variety of interior or exterior routing protocols by which a respective one of routes 82 was learned. As illustrated, example routing protocols include BGP, IS-IS, OSPF, RIP, and the like.

In one embodiment of the invention, route classification 86 comprises a set of labels that indicate in which of a number of classifications of respective one of routes 82 is assigned. For example, route classification 86 may utilize as "E" to indicate a route is classified as an external route, i.e., has been learned from an exterior routing protocol. Similarly, route classification 86 may utilize an "I" to indicate a route is classified as an internal route, i.e., has been learned from an interior routing protocol. Virtually any other label or other data format could be used to indicate the classification of the route. For example, "non-trusted" and "trusted" labels, or simple one or more data bits or other data units could be used to indicate an enumerated route classification based on one of protocols 84 by which the corresponding one of routes 82 was learned.

FIG. 6 illustrates an example embodiment of a portion of forwarding data 60 (FIG. 4), as generated by routing engine 58. As illustrated, forwarding data 60 specifies destinations 92 within networking environment 2 (FIG. 1) as viewed by router 8A. Each of destinations 92 is generated from a respective one of routes 82, and is associated with one of forwarding next hops 94 and a destination class 96. In particular, destination class 96 is generated based on route classification 86 of routes 82 from which destinations 92 is derived. Forwarding engine 56 makes use of destination class 96 to automatically filter packets, as described in detail above.

Figure 7:
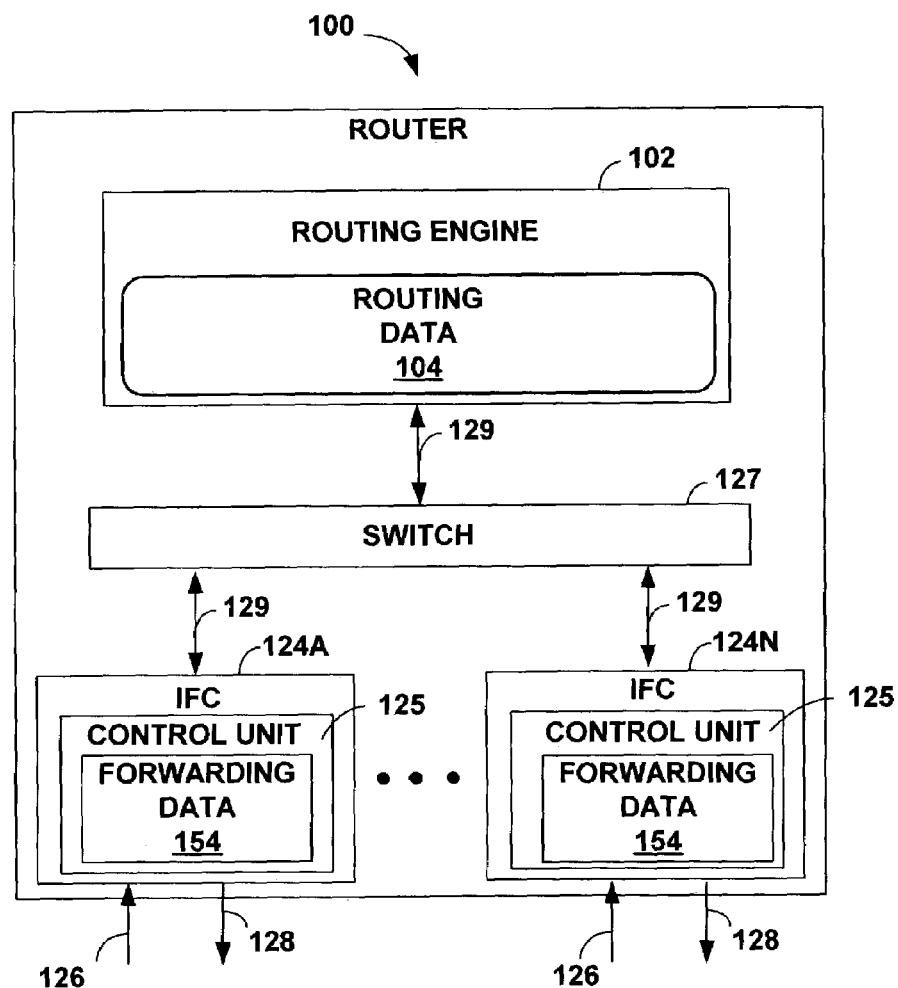
FIG. 7 is a block diagram illustrating another exemplary router that utilizes automated filtering techniques to prevent network attacks consistent with the principles of the invention.

FIG. 7 is a block diagram illustrating another exemplary router 100 that utilizes automated filtering techniques to prevent network attacks. In the illustrated embodiment, router 100 includes a routing engine 102 that maintains routing data 104 that describes the topology of public network 16. Routing engine 102 analyzes stored routing information 104 and generates forwarding information (not shown) for interface cards 124A-124N ("IFCs 124"). In other words, in contrast to the exemplary router 50 of FIG. 4, router 100 does not include centralized forwarding hardware. In particular, router 100 distributes the forwarding functionality to IFCs 124.

IFCs 124 receive and forward packets via network links 126 and 128, and are interconnected via a high-speed switch 127 and internal data paths 129. Switch 127 may comprise, for example, switch fabric, switchgear, a configurable network switch or hub, and the like. Data paths 129 may comprise any form of communication path, such as electrical paths within an integrated circuit, external data busses, optical links, network connections, wireless connections, and the like. IFCs 124 may be coupled to network links 126, 128 via a number of interface ports (not shown).

Each of IFCs 124 comprises a control unit 125 that forwards packets in accordance with forwarding data 154 generated by routing engine 102. Specifically, control unit 125 determines a next hop for each inbound packet based on the distributed forwarding information 154, identifies a corresponding IFC 124 associated with the next hop, and relays the packet to the appropriate IFC 124 via switch 127 and data paths 129. During the forwarding process, control units 125 of the IFCs 124 automatically filter packets in accordance with the principles of the invention as described herein.

Various embodiments of the invention have been described. These and other embodiments are within the scope of the following claims.

The invention claimed is:

1. A method comprising:
receiving, in a network router, routing information communicated by one or more routing protocols, wherein the routing information defines network routes;
maintaining route data within the network router based on the received routes;
designating, within the route data, a first portion of the routes as internal routes when the routing information that defines the first portion of the routes is received via an interior routing protocol for a local network to which the network router belongs;
designating, within the route data, a second portion of the routes as external routes when the routing information that defines the second portion of the routes is received via an exterior routing protocol;
receiving packets with the network router;
after receiving the packets, associating each of the packets with one of the routes using the route data;
after associating each packet with one of the routes, identifying a designation for the associated route; and
selectively forwarding each of the packets based on the identified designation of the associated route by dropping any of the packets upon determining that (i) the packet is associated with a route that is designated within the route data as an internal route, and (ii) that the packet was received from a device external to the local network.

2. The method of claim 1, wherein selectively forwarding packets comprises:
receiving the packets by a set of interfaces;
designating the interfaces connected to the devices within the local network as internal interfaces;
designating the interfaces connected to devices not within the local network as external interfaces; and
selectively forwarding the packets based on the designation of the respective interfaces from which the packets were received and the identified designations of the routes associated with the packets.

3. The method of claim 2, wherein selectively forwarding packets by dropping packets comprises dropping packets associated with routes that are designated within the route data as internal routes and that were received from interfaces designated as external interfaces.

4. The method of claim 2, wherein selectively forwarding packets comprises forwarding packets associated with routes that are designated within the route data as internal routes and that were received from interfaces designated as internal interfaces.

5. The method of claim 2, wherein selectively forwarding packets comprises forwarding packets associated with routes that are designated within the route data as external routes.

6. The method of claim 2, wherein selectively forwarding packets comprises:
forwarding packets associated with routes that are designated within the route data as internal routes and that were received from interfaces designated as internal interfaces;
forwarding packets associated with routes that are designated within the route data as external routes; and
dropping packets associated with routes that are designated within the route data as internal routes and that were received from interfaces designated as external interfaces.

7. The method of claim 1, further comprising automatically designating the routes within the route data and selectively filtering the packets without requiring manual configuration of one or more filters.

8. The method of claim 1, wherein selectively forwarding the packets comprises selectively forwarding the packets with a central forwarding engine.

9. The method of claim 1, wherein selectively forwarding packets comprises selectively forwarding the packets with a control unit.

10. The method of claim 1, wherein selectively forwarding packets comprises selectively dropping packets with distributed interface cards based on the designation of the routes.

11. The method of claim 1, wherein selectively forwarding each of the packets comprises selectively forwarding each of the packet based on the identified designation of the associated route by dropping the packet without using a destination-specific filter to drop the packet.

12. A method comprising:
receiving routing information via one or more routing protocols, wherein the routing information defines routes to network destinations;
generating forwarding information in accordance with the routing information, wherein the forwarding information designates the network destinations corresponding to routes learned via an interior routing protocol as interior network destinations and network destinations corresponding to routes learned via an exterior routing protocol as exterior network destinations;
receiving packets by a set of interfaces, wherein a first subset of the interfaces are designated as internal interfaces connected to devices within a local network, and a second subset of the interfaces are designated as external interfaces connected to devices not within the local network;
associating the received packets with corresponding network destinations in accordance with the forwarding information; and
selectively forwarding the packets to the corresponding network destinations based on the designation of the respective interfaces from which the packets were received and the designation of the network destinations associated with the packets by:
forwarding the packets associated with network destinations designated within the forwarding information as internal network destinations that were received from interfaces designated as internal interfaces,
forwarding the packets associated with network destinations designated within the forwarding information as external network destinations, and
dropping the packets associated with network destinations designated within the forwarding information as internal network destinations that were received from interface designated as external interfaces.

13. The method of claim 12, wherein selectively forwarding the packets comprises:
- distributing the forwarding information to the interfaces; and
- dropping at least a subset of the packets with the interfaces based on the designation of the respective interfaces from which the packets were received and the designation of the associated network destinations within the forwarding information.

14. A network device comprising:
- interface cards to receive routing information via one or more routing protocols, wherein the routing information defines network routes; and
- a control unit to maintain route data based on the received routes, classify the routes based on the routing protocol by which the routes were received by designating, within the route data a first portion of the routes as internal routes when the routing information that defines the first portion of the routes is received via an interior routing protocol and designating within the route data a second portion of the routes as external routes when the routing information that defines the second portion of the routes is received via an exterior routing protocol,
- wherein the control unit receives packets, associates each of the received packets with one of the routes using the route data, identifies a designation for the associated route using the route data and selectively forwards each of the packets based on the identified designation of the associated route by dropping any of the packets upon determining that (i) the packet is associated with a route that is designated within the route data as internal route and, (ii) the packet was received from a device not within a local network to which the network device belongs.

15. The network device of claim 14, wherein the control unit receives the packets from the interface cards and designates interfaces of the interface cards as either internal interfaces connected to devices within the local network or external interfaces connected to devices not within the local network, and selectively forwards the packets based on the designation of the respective interfaces from which the packets were received and the identified designations of the routes associated with the packets.

16. The network device of claim 15, wherein the control unit drops the packets that are associated with routes that are designated within the route data as internal routes and that were received from interfaces designated as external interfaces.

17. The network device of claim 14, wherein the control unit automatically designates the routes within the route data based on the routing protocols by which the routes were learned, and selectively filters the received packets without requiring one or more filters that filter based on information within the packet.

18. The network device of claim 17, wherein the control unit comprises:
- a routing engine to generate the routing information, wherein the routing engine further generates forwarding data that associates network destinations with next hops and indicators that designates network destinations corresponding to routes learned via an interior routing protocol as interior network destinations and network destinations corresponding to routes learned via an exterior routing protocol as exterior network destinations, and
- a forwarding engine to selectively forward the packets in accordance with the forwarding data.

19. The network device of claim 18, wherein the control unit distributes the forwarding data to the interface cards, and the interface cards drop at least a subset of the packets based on the classification data.

20. A computer-readable storage medium comprising instructions that cause a programmable processor to:
- receive, in a network router, routing information communicated by one or more routing protocols, wherein the routing information defines network routes;
- maintain route data within the network router based on the received routes,
- designate, within the route data, a first portion of the routes as internal routes when the routing information that defines the first portion of the routes is received via an interior routing protocol for a local network to which the network router belongs;
- designate, within the data structure, a second portion of the routes as external routes when the routing information that defines the second portion of the routes is received via an exterior routing protocol;
- receive packets with the network router;
- after receiving the packets, associate the each of the packets with one of the routes using the route data;
- after associating each packet with one of the routes, identify a designation for the associated routes; and
- selectively dropping any of the packets upon determining that (i) the packet is associated with a route that is designated within the route data as an internal route, and (ii) the packet was received from a device external to the local network.

* * * * *